Patented Mar. 6, 1945

2,370,839

UNITED STATES PATENT OFFICE 2,370,839

CONDENSATION PRODUCTS AND PROCESSES FOR THEIR PRODUCTION

William J. Burke, Marshallton, and James H. Werntz, Wilmington, Del., assignors to E. I. du Pont de Nemours & Company, Wilmington, Del a corporation of Delaware No Drawing. Application November 2, 1942, Serial No. 464,244

16 Claims. (Cl. 260—244)

This invention relates to new condensation products and more particularly refers to condensation products derived from three components, one of which is a heteromonocyclic urea derivative, and processes for their production and use.

It is known that there occurs in nature certain products which display surface-tension modifying properties and have been used as emulsifying agents. Such products are relatively costly, difficult to isolate in pure form, and unsuitable for many of the applications of modern industry which employ surface-tension modifying agents. Solubility in water of this nonionic type of agent, however, does not depend on anionic or cationic solubilizing groups, and it is therefore substantially unaffected by the presence of salts, such as may be present in hard water, and of acids and bases, e. g., the ones customarily employed in textile-treating operations. Recognizing that a synthetic product of this type would enjoy a wider field of usefulness than the naturally occurring materials, earlier investigators have sought to prepare emulsifying agents by modifying certain polyethers and certain polyhydroxy compounds which are obtainable from sugars by the introduction of suitable organic radicals. These investigations serve to confirm the utility of the nonionic type of surface-tension modifying agent and to emphasize its superiority, especially in hard water, to soap. However, the commercial scope of these prior developments has been limited by the high cost and relative scarcity of suitable intermediates. Furthermore, the development and commercial utilization of synthetic nonionic detergents and emulsifying agents has been seriously hampered by the lack of practical methods of manufacture which have been limited both in scope and yield performance.

It is an object of this invention to produce new condensation products which avoid the foregoing disadvantages of prior art surface-active materials and numerous other disadvantages which directly or indirectly result therefrom. A further object is to produce condensation products having particularly valuable surface-tension modifying properties. A still further object is to produce materials of this type by processes which are inexpensive and easy to practice. A still further object is to produce derivatives of urea which have a multiplicity of uses in the industrial arts. A still further object is to produce a new class of heteromonocyclic urea derivatives. Additional objects will become apparent from a consideration of the following description and claims.

These objects are attained in accordance with the present invention wherein the following components are reacted—a heteromonocyclic urea derivative wherein the nitrogen atoms thereof are free from directly attached hydrogen atoms, an organic compound substituted with at least two hydroxyl groups, and an organic compound having at least six carbon atoms, and a labile hydrogen atom. In a more restricted sense, this invention is concerned with products produced by the foregoing reaction wherein the second component is a glycol. In a still more restricted sense, this invention is concerned with products produced by reacting a heteromonocyclic compound having an N,N'-dialkoxymethyl-ureylene group as part of the ring structure, a glycol, and a monofunctional organic compound having at least six carbon atoms and a labile hydrogen atom. In a still more restricted sense, this invention pertains to compounds produced by reacting N,N'-bis-(methoxymethyl)uron with a glycol and a monofunctional monohydroxy compound containing at least six carbon atoms. In a still more restricted sense, this invention pertains to compounds produced in accordance with the foregoing processes wherein the individual components thereof are selected in such manner that the resulting products possess the stated desired properties to a surprisingly high degree. In a still more restricted sense this invention pertains to products produced in accordance with the foregoing processes wherein the conditions of reaction are carefully regulated and certain assistants therefor are used to improve the desirable properties thereof. An additional embodiment of the invention is the use of the foregoing products for various purposes in the industrial arts.

In accordance with this invention, heteromonocyclic urea derivatives are reacted with a class of organic compounds containing a plurality of hydroxyl groups and a class of condensible organic compounds capable of imparting surface-active properties to the resulting products.

Reactions involving the first two components of this reaction are described in detail in a copending patent application filed by Burke and Hoover on August 31, 1942, Serial No. 456,790, entitled "Condensation products and processes for their production." The conditions of reaction and catalysts and other assistants therefor are likewise described in considerable detail in the foregoing co-pending application, and the instructions thereof are to be understood as applicable hereto.

Many of the heteromonocyclic urea derivatives suitable for use herein conform to the following general formula:

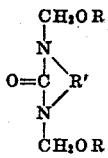

where R is hydrogen or the radical of a monohydric alcohol and R' is a divalent organic radical completing the heterocyclic ring. These compounds, which may be described as being heteromonocyclic compounds having a di(oxymethyl) ureylene group as part of the ring structure, react upon heating with glycols to eliminate a hydroxy compound, ROH, or water and produce a linear condensation polymer. Since N,N'-bis(oxymethyl) compounds possessing this cyclic structure have no hydrogen atoms attached to the nitrogen atoms, cross-linking does not occur as it does when, for example, bis(methoxymethyl)urea is condensed with glycol, and therefore a much wider temperature range may be employed in the preparation of polymers without encountering the formation of insoluble by-products. By including in the reaction mixture an organic compound, which contains at least one functional group and is capable of reacting with these heteromonocyclic compounds having a di(oxymethyl)ureylene group as part of the ring structure, modified linear condensation polymers are obtained. When the modifying organic compound contains six or more carbon atoms and is used in suitable proportions new water-soluble products are obtained which possess useful surface-active properties.

Certain probable reactions have been postulated to explain the formation of the products obtained by this invention. By way of illustration only and by imposing no limitation whatsoever the following reactions are presented, recognizing that no structural data are available and that the products are probably of greater complexity than indicated. Bis-(methoxymethyl)uron probably reacts with an equimolecular quantity of ethylene glycol as follows:

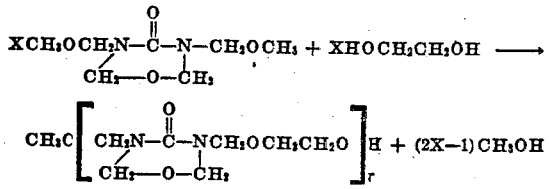

Now, if one mole of dodecanol-1 for each 5 moles of bis-(methoxymethyl)uron and glycol is included in the reaction mixture, a probable reaction mechanism is as follows:

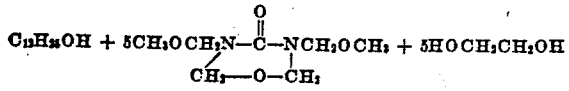

On the other hand 2 moles of dodecanol-1, 9 moles glycol and 10 moles of bis-(methoxymethyl)uron may react as follows:

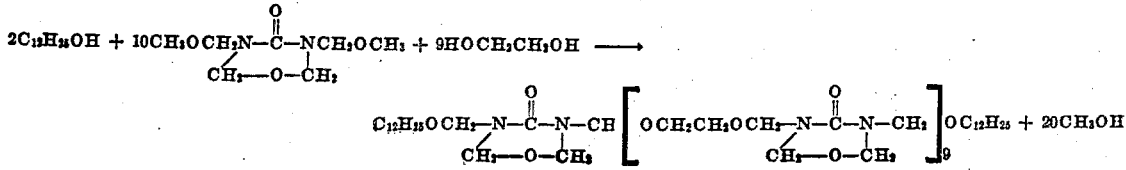

Regardless of the actual proportions employed the products probably consist of each of the indicated types. In actual practice more efficient detergents are obtained when equimolecular quantities of bis-(methoxymethyl)uron and glycol are employed. For best results it is desirable that the molar ratio of the ureylene to the polyhydric alcohol be between 1:1 and 2:1 and that there be between 2.5 and 50 moles of modifier for each 100 moles of the ureylene. The products of this invention may therefore be described as condensation polymers of 40—X moles of a monomeric polyhydric alcohol, 40 moles of a heteromonocyclic compound having an N,N'-di-(oxymethyl) ureylene group as part of the ring structure and 1 to 20 moles of an organic compound of 6 or more carbon atoms having a labile hydrogen atom in which X is a whole number ranging from 0 to 20.

The general procedure for preparing these new nonionic surface-active polymers is to heat the reactants with or without a catalyst under conditions such that the low molecular weight alcohol or water which is formed, can be removed from the reaction mixture. The conditions used vary considerably with the monomer being polymerized. Glycols react sluggishly in the absence of a catalyst, and the condensation is usually conducted, therefore, in the presence of a small amount of an acid or acidic salt as catalyst and under such conditions that the alcohol or water formed will be removed from the sphere of reaction as rapidly as possible. This is conveniently done by carrying out the reaction in the presence of a catalyst at a temperature above the boiling point of the low molecular weight alcohols, such as methanol, or of water and with nitrogen or other inert gas bubbling through to carry off the alcohol or water as rapidly as it is formed. The preferred proportions usually employed are equimolecular amounts of the heteromonocyclic N,N'-di(oxymethyl)ureylene compound and a glycol plus 0.5–0.025 mole of an organic compound of 6 or more carbon atoms, and having at least one labile hydrogen atom.

Among the heteromonocyclic compounds which have been found useful is tetrahydro-3,5-bis-(methoxymethyl)-1,3,5-oxadiazin-4-one,

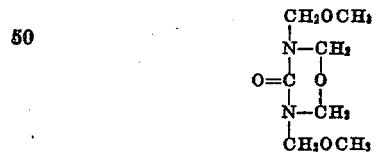

(hereafter referred to as bis-(methoxymethyl)-uron), which is prepared from urea, formaldehyde, and methanol by essentially the method described by Kadawaki (Bull. Chem. Soc. Japan 11, 248–61 (1936)). This monomer permits the preparation of surface-active condensation polymers based entirely on urea, formaldehyde, methanol, a glycol and the modifying agent used in the con-

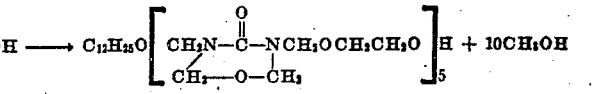

densation. Tetrahydro-1,3-bis-(alkoxymethyl)-5-alkyl-2(1)-s-triazones

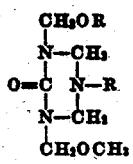

which are prepared from urea, formaldehyde, an alcohol, and a primary amine by the method described in copending application S. N. 426,905, filed by Burke on January 15, 1942, are particularly useful since they provide a method for preparing basic polymers and because incorporation of this monomer either as a major or as a minor component stabilizes the surface-active condensation polymers against degradation by strong acids. 4,5-dihydro-1,3-bis-(alkoxymethyl) - 2(3)-imidazolones

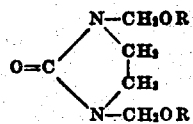

are useful because of the excellent stability of the ring system and because the polymers formed from them have high stability.

The products of this invention range from oils and soft resins to fatty or wax-like solids. They are often soluble in water, but they may be prepared so that they are in part insoluble in water, or so that in part they form with water more or less stable emulsions, or so that they are completely insoluble in water. These solubility characteristics depend upon the kind and the length of the polymer chain formed and upon the nature of the modifying organic compound. The solutions and emulsions, respectively, are stable to weak acids and to alkalis and to the agents causing hardness in water. The preferred products are, generally speaking, soluble or readily dispersible in water and in organic solvents such as ethyl alcohol, acetone, benzene, ethylene dichloride, textile finishing oils, ethyl ether, petroleum ether, white mineral oil, castor oil, and so forth.

The invention may be more readily understood by a consideration of the following illustrative examples wherein the quantities are stated in parts by weight:

EXAMPLE I

*Bis-(methoxymethyl)uron—Diethylene glycol polymer modified with dodecanol-1*

Thirty-eight parts of bis-(methoxymethyl)uron, 21.2 parts of diethylene glycol, 7.4 parts of dodecanol-1, and 0.2 part of methylbenzyloctadecylsulfonium methylsulfate were heated together on a steam bath in a 500 cc., three-neck flask with nitrogen bubbling through while stirring. The distillate was condensed in a dry-ice trap and 11.6 parts collected. The theoretical amount of methanol is 12.8 parts. After heating two hours the product gave clear solutions in water. Fifty-one parts of a clear viscous resin was obtained. As a wool-scouring agent it had practically the same detergency in both hard and soft water. In soft water scouring tests on cotton goods it compared favorably with sodium oleate. This product, made by reacting 1 mole of dodecanol-1 with 5 moles each of bis-(methoxymethyl)-uron and diethyleneglycol is a more efficient cleansing agent for cotton in soft water than a similar product made by reacting dodecanol-1 with 10 moles each of the resin ingredients, which in turn is more efficient than the product made by reacting dodecanol-1 with 3 moles each of the resin ingredients, which in turn is a more effective cotton scouring agent than the product obtained by reacting dodecanol-1 with 5 moles of bis-(methoxymethyl)uron and 4.5 moles of diethylene glycol. Polymers in which dodecanol-1 has been reacted with 3 moles each and with 7 moles each of bis-(methoxymethyl)uron and diethylene glycol have also been evaluated as wool scouring agents. The 7-mole product was a better wool scouring agent than the 3-mole product but was not quite as effective as the 5-mole product. The 7-mole product was equal to sodium oleate in soft water; in hard water it was considerably superior to sodium oleate as a wool scouring agent. More effective wetting agents may be obtained by attaching the solubilizing groups to secondary carbon atoms of the long-chain radical.

In place of dodecanol-1, one may use octanol-1, hexadecanol-1, octadecanol-1, oleyl alcohol, pentadecanol-8, heptadecanol-9, or the related tertiary alcohols. Technical mixtures obtainable by the carboxylic reduction of coconut oil, sperm oil, beef tallow, castor oil, peanut oil, drying oils, etc., may be employed. The higher alcohols obtainable as by-products in the synthesis of methanol by catalytic processes may also be employed.

EXAMPLE II

*Bis-(methoxymethyl)uron — Ethylene glycol polymer modified with dodecanol-1*

Dodecanol-1 was heated on the steam bath with 10 moles each and 5 moles each of bis-(methoxymethyl)uron and ethylene glycol, employing 0.02 mole octadecylphenylmethylsulfonium methyl sulfate in one case and in the second case 0.01 mole methylbenzyloctadecylsulfonium methylsulfate as catalyst. The reactants were heated 5 and 10 hours respectively, while blowing with nitrogen. The products were viscous oils readily soluble in water to yield strongly sudsing solutions.

EXAMPLE III

*Bis-(methoxymethyl)uron — Diethylene glycol polymer modified with secondary-dodecylphenol*

Secondary-dodecylphenol was heated on the steam bath with 10 moles each of bis-(methoxymethyl)uron and diethylene glycol in the presence of 0.02 mole methylphenyloctadecylsulfonium methylsulfate for 6.5 hours while blowing with nitrogen. The product was a clear viscous resin which gave sudsing solutions in water.

EXAMPLE IV

*Bis-(methoxymethyl)uron—Alpha-methyl glucoside polymer modified with dodecanol-1*

Nine and seven-tenths parts alpha-methyl glucoside, 9.5 parts bis-(methoxymethyl)uron, 2 parts dodecanol-1, and 0.05 part methylbenzyloctadecylsulfonium methylsulfate were heated on the steam bath while agitating with a stream of nitrogen for 30 minutes. A portion of the glucoside dissolved and the temperature was raised to 130° C. where vigorous bubbling set in. The temperature was raised to 180° C. during the next 30 minutes, and foaming finally subsided. The product dissolved in water to give sudsing solutions.

Example V

*Bis - (methoxymethyl)uron — Diethylene glycol polymer modified with lauramide*

Nine and five-tenths parts of bis-(methoxymethyl)uron, 5.3 parts diethylene glycol, 2 parts lauramide, and 0.05 part methylbenzyloctadecylsulfonium methylsulfate were heated on the steam bath while blowing with nitrogen. After heating 20 hours, the resin remained clear on cooling. The resin gave clear sudsing solutions in hot water. On cooling, a fine crystalline precipitate separated from the aqueous solution and was filtered off. The filtrate gave a good suds and was perfectly clear.

In place of lauramide one may use caprylic amide, palmitic amide, stearamide, oleic amide, the amide of diheptyl-acetic acid, etc. Technical mixtures of amides obtainable from the mixtures of acids occurring in coconut oil, sperm oil, beef tallow, castor oil, peanut oil, drying oils, etc., may also be employed. The amides of the higher acids obtainable by the oxidation of petroleum hydrocarbons and waxes may also be used. Ureides and mono-substituted amides such as N-methyllauramide may be used.

Example VI

*Bis - (methoxymethyl)uron — Diethylene glycol polymer modified with N-allylaniline*

One and three-tenths parts of N-allylaniline, 9.5 parts bis-(methoxymethyl)uron, 5.3 parts diethylene glycol and a few crystals of ammonium chloride together with a few drops of concentrated hydrochloric acid were heated on the steam bath 1.5 hours while blowing with nitrogen. On cooling, the product was a clear, viscous, brown oil which was soluble in water and sudsed. The solution remained clear when sodium acetate was added to raise the pH to 7, and remained clear when sodium hydroxide was added to raise the pH to 9.

Ninety-three parts of aniline, 570 parts of bis-(methoxymethyl)uron, 320 parts of diethylene glycol and a small amount of ammonium chloride were heated together on the steam bath. After 30 minutes the product was completely soluble in water. N-ethylaniline can be used in place of aniline.

Other cyclic primary and secondary amines may be used, such as alpha-naphthylamine, beta-naphthylamine, cyclohexylamine, N-methylcyclohexylamine, etc.

Example VII

*Bis - (methoxymethyl)uron — Diethylene glycol polymer modified with N-dodecylamine*

Nineteen parts of bis-(methoxymethyl)uron, 10.6 parts of diethylene glycol, 3.7 parts of N-dodecylamine, and 0.4 part of ammonium chloride were heated on the steam bath while blowing with a stream of nitrogen. After heating nine hours, the product was a yellow oil which dissolved in water to give sudsing solutions of about pH 8. The aqueous solution remained clear when acidified with hydrochloric acid. The product was soluble in benzene and insoluble in petroleum ether.

In place of N-dodecylamine, one may use N-octylamine, N - hexadecylamine, N - octadecylamine, N-oleylamine, pentadecyl-8-amine, or related secondary amines such as N-octyl-N-methylamine, dioctylamine, etc. Technical mixtures of amines derived from the mixture of acids occurring in coconut oil, sperm oil, beef tallow, castor oil, peanut oil, drying oils, etc., may also be employed.

Example VIII

*Bis-(methoxymethyl)uron—Diethylene glycol polymer modified with beta-naphthol*

Twenty-nine parts of beta-naphthol, 106 parts of diethylene glycol, 190 parts of bis-(methoxymethyl)uron, and 2 parts of methylbenzyloctadecylsulfonium methylsulfate were heated one hour on the steam bath while blowing with nitrogen. The product was a clear viscous oil. It was soluble in water and gave sudsing solutions.

In place of beta-naphthol, one may employ other cyclic hydroxy compounds such as phenol, the cresols, alphanaphthol, catechol, terpineol, etc.

Example IX

*Bis-(methoxymethyl)uron—Diethylene glycol polymer modified with dodecane-1-thiol*

Nine and five-tenths parts of bis-(methoxymethyl)uron, 5.3 parts of diethylene glycol, 2 parts of dodecane-1-thiol, and 0.1 part of methylbenzyloctadecylsulfonium methylsulfate were heated on the steam bath with a stream of nitrogen bubbling through for about 1.5 hours. The product was a viscous oil which gave strongly sudsing solutions in water.

In place of dodecane-1-thiol, one may employ the thiols and mixtures of thiols which contain the hydrocarbon radical disclosed for the alcohols in Example I.

Example X

*Bis-(methoxymethyl)uron—Diethylene glycol polymer modified with lauric acid*

Nine and five-tenths parts of bis-(methoxymethyl)uron, 5.3 parts of diethylene glycol, and 2 parts of lauric acid were heated on the steam bath with nitrogen bubbling through the reaction mixture. After heating 7 hours little polymerization had taken place, so 0.1 parts of methylbenzyloctadecylsulfonium methylsulfate was added and the reaction mixture heated about two hours longer. The viscous product gave sudsing solutions in water.

In place of lauric acid, one may employ the acids disclosed for the preparation of amides in Example V.

Example XI

*Bis - (methoxymethyl)uron — Diethylene glycol polymer modified with a white oil monosulfonamide*

Nine and five-tenths parts of bis-(methoxymethyl)uron, 5.3 parts of diethylene glycol, 2.9 parts of a monosulfonamide derived from white oil (the product described in U. S. Patent No. 2,197,800 on page 3, column 2, lines 49–68) by treating it with sulfur dioxide and chlorine, and saponification of the product, having an estimated molecular weight of 291, and 0.034 g. of ammonium chloride were heated on the steam bath while blowing with a stream of nitrogen for 5 hours. The product had not increased in viscosity and did not give sudsing in water. Three drops of concentrated hydrochloric acid was added and the heating continued for one hour. The product was now viscous and gave sudsing solutions in water.

In place of the foregoing sulfonamide derived from white oil, one may employ similar products derived from kerosene fractions, paraffin wax, and so forth. One may also employ cyclic sulfonamides such as p-toluenesulfonamide or cyclohexanesulfonamide.

EXAMPLE XII

*Bis-(methoxymethyl)uron—Diethylene glycol polymer modified with alpha-monostearin*

One part of alpha-monostearin, 1.5 parts of diethylene glycol, 2.6 parts of bis(methoxymethyl)uron, and 0.03 part of methylbenzyloctadecylsulfonium methylsulfate was heated on the steam bath with a stream of nitrogen bubbling through the reaction mixture. After heating one hour, the product was a clear viscous oil while hot which set up to a white solid on cooling. The product was soluble in water and gave sudsing solutions. In place of alpha-monostearin, one can employ alpha-monolaurin, or a technical monoglyceride prepared by reacting coconut oil with 2 moles of glycerin in the presence of a small amount of litharge.

In place of the long-chain monoglycerides obtained from coconut oil, one may also use the technical mixtures of monoglycerides obtained from sperm oil, beef tallow, castor oil, peanut oil, drying oils, etc. Other long chain substituted polyhydroxy compounds which may be employed to modify the bis-(methoxymethyl)-uron/glycol polymers include the long-chain thioethers derived from thiosorbitol, such as 1-dodecyl-thiosorbitol and the long-chain mono- and diethers of glycerin such as monododecyl glyceryl ether.

EXAMPLE XIII

*Tetrahydro-1,3-bis-(methoxymethyl)-5-beta-hydroxyethyl-2(1)s-triazone—Diethylene glycol polymer modified with dodecanol-1*

One hundred seventeen parts of tetrahydro-1,3-bis-(methoxymethyl)-5-beta-hydroxyethyl-2(1)s-triazone, 53 parts of diethylene glycol, 11 parts of dodecanol-1, and 1.16 parts of diethylmethylsulfonium iodide were heated on the steam bath while blowing with nitrogen. After heating 8.5 hours, the product was a yellow viscous oil. It gave sudsing solutions in water.

It is to be understood that the foregoing examples are illustrative merely of a few of the many embodiments to which this invention is susceptible. They may be varied widely with respect to the individual reactants, the assistants therefor, the proportions thereof, and the conditions of reaction, without departing from the scope of the invention.

As representative of the many heteromonocyclic urea derivatives which are suitable for use herein mention may be made of 4,5-dihydro-1,3-bis-(methoxymethyl) - 2(3)imidazolone, 1,3 - bis-(methoxymethyl)-5,5-dimethylhydantoin, tetrahydro-1,3-bis-(methoxymethyl)-5-methyl-2-(1)-s-triazone, N,N'-bis-(propoxymethyl)-barbituric acid, N,N'-bis-(methoxymethyl)parabanic acid, N,N'-bis-(methoxymethyl)-ethyleneurea, N,N'-bis-(hydroxymethyl)ethyleneurea, N,N'-bis-(ethoxyethoxymethyl)uron, N,N'-bis-(butoxymethyl)-uron, 3,5-bis-(methoxymethyl)tetrahydro-1,3,5-thiadiazine-4-one, N,N'-bis-(amyloxymethyl)hydantoin, N,N'-bis-(furyloxymethyl)-uron, N,N'-bis-(benzyloxymethyl)uron, N,N'-bis-(methoxymethyl)alloxan, N,N'-bis-(methoxymethyl)isobarbituric acid, N,N'-bis-(ethoxymethyl)-hydrouracil, N,N'-bis-(ethoxymethyl)uron, etc. These compounds are all similar in that they have a di-(oxymethyl)ureylene group as part of a heterocyclic ring, and as a consequence all valence bonds of the nitrogen atom are attached to carbon atoms. Because of the structure, they behave as strictly difunctional compounds in their reactions with glycols. While this invention also contemplates the use of bis-(hydroxymethyl) compounds, the bis-(methoxymethyl) compounds are preferred since they are lower melting, frequently liquid, and dissolve readily in the other components of the reaction mixture. The bis-(alkoxymethyl) compounds have the structure

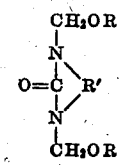

in which R is the non-hydroxy portion of a monohydric alcohol boiling below 210° C. at 760 mm. and preferably a hydrocarbon radical. R' is a divalent organic radical completing a 5- or 6-member heterocyclic ring and composed of a chain of two or three atoms, the terminal atoms, which are joined to the ureylene nitrogen atoms to close the ring, being carbon atoms. Among the divalent radicals which are represented in this formula by R' may be mentioned

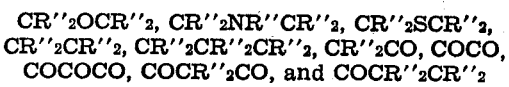

where R'' is a hydrogen atom or an alkyl group. The alcohols corresponding to the radicals R include methyl, ethyl, propyl, isopropyl, butyl, isobutyl, amyl, hexyl, octyl, benzyl, furfuryl, tetrahydrofurfuryl, methoxy ethyl, ethoxy ethyl alcohols, and in general any monohydric alcohol boiling below 210° C. at 760 mm. For convenience in operating, the ureylene compounds should be so selected that the alcohol ROH, corresponding to the radical R, is more volatile than the particular modifying organic compound used. In general, methyl alcohol is preferred since it is readily removed.

Among the numerous organic compounds containing a plurality of hydroxyl groups suitable for use herein, mention may be made of glycols of the formula HOR''OH in which R'' is a divalent radical having the two OH groups attached to different aliphatic carbon atoms and not containing other reactive groups. Aromatic residues may form part of a molecule, provided the hydroxyl groups are attached to aliphatic carbon atoms. Hetero atoms such as oxygen, sulfur. NH and NR may also form part of the diradical R'', as for example in the polyethylene glycols and in diethanol ethylamine. Since the reactivity of the hydroxyl group is greatest if they are primary and least if they are tertiary, compounds having primary hydroxyl groups are to be preferred to those having secondary groups, and those having secondary groups are to be preferred to those having tertiary groups. Examples of suitable glycols include ethylene glycol, diethylene glycol, triethylene glycol, hexamethylene glycol, 1,3-butylene glycol, etc. Higher polyols such as glycerin, erythritol, pentaerythritol, sorbitol, 1-thiosorbitol, glucose, alpha-methyl glucoside can also be used, but as is to be expected the products, while useful, are not linear and their use may result in the formation of products of low solubility in water.

A representative few of the many organic compounds having at least six carbon atoms and a labile hydrogen atom which are contemplated for use herein are the alcohols, mono glycerides, akyl phenols, amides, ureides, N-substituted anilines, sulfonamides, thiols, thioethers such as 1-dodecylthiosorbitol, acids, methylolamides, monoalkyl glyceryl ethers, esters of hydroxyacetic acid, etc. In general the mono-functional compounds are preferred. The monohydroxy compounds are preferred since they condense rapidly in the presence of mild catalysts to yield products of high solubility in water. In certain cases, where the polyhydric alcohol reagent contains at least six carbon atoms, an excess of it may be used as the modifying agent, thus making it unnecessary to add an extraneous component to the reaction mixture.

Throughout the present specification and claims, a "labile hydrogen atom" is understood to be a hydrogen atom attached to oxygen, sulfur or nitrogen.

The catalyst used varies considerably with the stability and basicity of the polymer ingredients. Basic ingredients require more strongly acidic catalysts, while some neutral monomers such as bis-(methoxymethyl)uron, which undergo troublesome crosslinking reactions at high temperatures in the presence of strong acid catalysts, can be condensed with glycols in the presence of trialkyl sulfonium salts. Strong acids, materials easily converted to strong acids, salts of strong acids and weak bases, and trialkylsulfonium iodides and sulfates are all catalysts for this reaction. The preferred catalysts include, in their probable order of decreasing strength, sulfuric acid, hydrochloric acid, phosphoric acid, p-toluenesulfonic acid, dimethyl sulfate, diethylmethylsulfonium methylsulfate, methylphenyloctadecylsulfonium methylsulfate, iodine, ammonium chloride, zinc chloride, magnesium bromide, diethylmethylsulfonium iodide, and dodecyldimethylsulfonium iodide. The amount of these catalysts required lies in the range of 0.001 to 0.1 mole per mole of bis-(oxymethyl) compound used, with the optimum concentration usually lying in the range of 0.005 to 0.02 mole. Chloroform which also acts as an extremely mild catalyst for the condensation is easily removed from the final product so is usually used in much higher concentrations and may effectively serve both as catalyst and solvent for the reaction. It is to be noted that the above-listed agents all belong to the class of catalysts known to be useful in promoting acetal formation and interchange.

In general, the pH of the reaction mixture containing the catalyst lies between 2 and 6 where the pH is taken with a glass electrode after dilution with an equal weight of water. Preferably the pH should lie between 3.5 and 4.5, especially with compounds such as N,N'-bis-(methoxymethyl)uron, which undergo troublesome side reactions at lower pH's. However, the pH of the reaction mixture is only one factor in the action of the catalyst. Diethylmethylsulfonium iodide, which changes the pH of the reaction mixture of bis-(methoxymethyl)uron and ethylene glycol very slightly, causes a large increase in the rate of condensation.

The temperature at which the polymerization reaction is carried out varies with the stability of the reactants involved. Since the rate of condensation increases with increasing temperature, it is usually advantageous to use as high a temperature as is possible without decomposition or other unfavorable side reactions. In general, the temperature lies between 50° C. and 250° C. with the optimum temperature between about 80° C. and 200° C. In order to prevent loss of volatile reactants and to avoid heating at very high temperatures, the initial stages of the polymerization may be carried out at a relatively low temperature, and the later stages at a higher temperature. The maximum temperature employed is dependent upon the catalyst used since it has been observed that polymers which are stable in the absence of catalyst at 180° C. may sometimes become insoluble and infusible at this temperature if a trace of such catalysts as diethylmethylsulfonium iodide or chloroform is present.

Since the polymerization takes place by a reversible reaction, it is desirable that the alcohol or water formed be removed as completely as possible from the reaction mixture in order to minimize the reaction time. This is accomplished conveniently by heating the polymerization mixture under reduced pressure, especially during the latter stages of the cycle. The same effect can also be obtained by passing an inert gas through the hot reactants to carry off the alcohol or water as they are formed. The latter method is effective at atmospheric, subatmospheric, or superatmospheric pressure. A similar method is to use an inert liquid such as toluene as the solvent. The solvent is refluxed in a column and the lower boiling alcohol or water removed from the top of the column by distillation. Since some of the reactants are rather volatile, it is often desirable to carry out the first stages of the polymerization in a closed reactor under the pressure developed by the alcohol evolved. This procedure is particularly useful in polymerizations involving the more volatile modifying organic compounds since greater precautions are necessary to maintain the balance of ingredients and it is necessary in the practice of this invention to exercise due caution to avoid overheating or too long heating since once a product of suitable solubility in water is formed the reaction should be stopped.

The new compositions disclosed in this invention which have a modifying radical of six or more carbon atoms belong to the class of capillary-active materials in that they have colloidal properties and therefore may be advantageously used in any process involving wetting, penetrating, deterging, dispersing, emulsifying, frothing, foaming, and kindred phenomena. These compositions may be employed in pure or standardized form and, if desired, in conjunction with known processing or treating agents. They may be used by themselves or in combination with other surface-active agents in any relation in which surface-active agents having colloidal properties have heretofore been used in the textile, leather, lacquer, paper, rubber and like industries. A few of the more important uses of these new products as textile assistants will be mentioned in order that the importance and widespread applicability of these new products in the textile industry may be fully appreciated. They may be used alone or in combination with suitable detergents for cleansing and scouring vegetable and animal fibers when removing fatty or oily materials, or in general in place of soap for cleansing operations. They may advantageously be employed as cleansing agents in hard water. The new products have capillary-active properties of different degree depending upon the nature and the length of the water-solubilizing polymer chain and the consequent degree of solubility and dispersing power in water. Furthermore, the nature and length of the modifying radical also contributes its influence on degree of solubility and dispersing power in water. These products are useful as auxiliary agents for various purposes in the dyeing industry, for instance, as dyeing agents, leveling assistants, and the like. The new products may be used with agents preventing the precipitation on the fiber of insoluble inorganic salts caused by the hardness of the water. If desired, they may be used in admixture with adjuvants, for instance water-soluble salts of phosphoric acid such as alkali pyrophosphates or alkali metaphosphates, other inorganic salts, for instance those used for altering the pH value of the mixture such as sodium carbonate, sodium silicate, or pure diluents such as sodium sulfate or sodium chloride, bleaching agents, or the like.

As many widely different embodiments of this invention may be made without departing from the spirit and scope thereof, it is to be understood that the invention is not limited to the specific embodiments thereof except as defined in the appended claims.

We claim:

1. A process for preparing condensation products which comprises heating in the presence of a catalyst at temperatures between 50° C. and 250° C., a monomeric organic polyol, an organic compound having at least six carbon atoms and a labile hydrogen atom, and a bifunctional heteromonocyclic urea derivative having the following general formula:

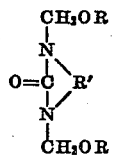

wherein R represents hydrogen or the non-hydroxy portion of a monohydric alcohol boiling below 210° C. at 760 mm., and R' represents a divalent organic radical the terminal atoms of which are carbon joined to the ureylene nitrogen atoms to close the ring.

2. A process for preparing condensation products which comprises heating in the presence of a catalyst at temperatures between 50° C. and 250° C., a glycol, an organic compound having at least six carbon atoms and a labile hydrogen atom, and a bifunctional heteromonocyclic urea derivative having the following general formula:

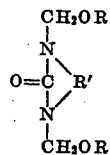

wherein R represents the non-hydroxy portion of a monohydric alcohol boiling below 210° C. at 760 mm., and R' represents a divalent organic radical completing a 5- or 6-member heterocyclic ring and composed of a chain of two or three atoms, the terminal atoms, which are joined to the ureylene nitrogen atoms to close the ring, being carbon atoms.

3. A process for preparing condensation products which comprises heating in the presence of a catalyst at temperatures between 50° C. and 250° C., a glycol, a monofunctional organic compound having at least six carbon atoms and a labile hydrogen atom, and a bifunctional heteromonocyclic urea derivative having the following general formula:

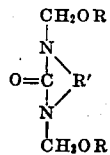

wherein R represents the non-hydroxy portion of a monohydric alcohol boiling below 210° C. at 760 mm., and R' represents a divalent organic radical completing a 5- or 6-member heterocyclic ring and composed of a chain of two or three atoms, the terminal atoms, which are joined to the ureylene nitrogen atoms to close the ring, being carbon atoms.

4. A process for producing condensation products which comprises heating in the presence of a catalyst at temperatures between 50° C. and 250° C. N,N'-bis-(methoxymethyl)uron with a glycol and a monofunctional, monohydroxy compound containing at least six carbon atoms.

5. A process for producing condensation products which comprises heating in the presence of a catalyst at temperatures between 80° C. and 200° C. N,N'-bis-(methoxymethyl)uron with a glycol and a normal primary alcohol containing from six to eighteen carbon atoms.

6. Products identical with the products produced by the process of claim 1.

7. Products identical with the products produced by the process of claim 2.

8. Products identical with the products produced by the process of claim 3.

9. Products identical with the products produced by the process of claim 4.

10. Products identical with the products produced by the process of claim 5.

11. A process for preparing condensation products which comprises heating in the presence of a catalyst at temperatures between 50° C. and 250° C. ethylene glycol, dodecanol-1, and N,N'-bis(methoxymethyl)uron.

12. A process for preparing condensation products which comprises heating in the presence of a catalyst at temperatures between 50° C. and 250° C. diethylene glycol, alpha-monolaurin, and N,N'-bis(methoxymethyl)uron.

13. A process for preparing condensation products which comprises heating in the presence of a catalyst at temperatures between 50° C. and 250° C. diethylene glycol, a white oil monosulfonamide, and N,N'-bis(methoxymethyl)uron.

14. Products identical with the products produced by the process of claim 11.

15. Products identical with the products produced by the process of claim 12.

16. Products identical with the products produced by the process of claim 13.

WILLIAM J. BURKE.
JAMES H. WERNTZ.